US011567889B2

(12) United States Patent
Mooney et al.

(10) Patent No.: US 11,567,889 B2
(45) Date of Patent: Jan. 31, 2023

(54) SERIAL COMMAND PROTOCOL ENCAPSULATING WIRE TRANSFER PROTOCOL

(71) Applicant: HACH LANGE GMBH, Berlin (DE)

(72) Inventors: Theophilus Brian Mooney, Fort Collins, CO (US); Mirko Liebender, Berlin (DE); Joseph Rockstan Williams, Greeley, CO (US); Gregory James Lipinski, Loveland, CO (US)

(73) Assignee: HACH COMPANY, Loveland, CO (US)

( * ) Notice: Subject to any disclaimer, the term of this patent is extended or adjusted under 35 U.S.C. 154(b) by 0 days.

(21) Appl. No.: 17/125,317

(22) Filed: Dec. 17, 2020

(65) Prior Publication Data
US 2021/0240649 A1 Aug. 5, 2021

Related U.S. Application Data

(60) Provisional application No. 62/968,610, filed on Jan. 31, 2020.

(51) Int. Cl.
H04L 12/40 (2006.01)
G06F 13/38 (2006.01)
G06F 13/42 (2006.01)
H04L 47/628 (2022.01)
H04L 69/18 (2022.01)
H04L 69/22 (2022.01)

(52) U.S. Cl.
CPC ........ G06F 13/385 (2013.01); G06F 13/4282 (2013.01); H04L 12/40071 (2013.01); H04L 47/628 (2013.01); H04L 69/18 (2013.01); H04L 69/22 (2013.01)

(58) Field of Classification Search
CPC .......... H04L 12/4604; H04L 12/40071; H04L 69/18; H04L 69/22; H04L 47/628; H04L 47/14; H04L 47/36; H04L 67/563; G06F 13/385; G06F 13/4282
See application file for complete search history.

(56) References Cited

U.S. PATENT DOCUMENTS

| 2006/0048006 | A1* | 3/2006 | Lou ................. G01R 31/31705 714/25 |
| 2006/0085518 | A1 | 4/2006 | Blackmore et al. |
| 2010/0180063 | A1* | 7/2010 | Ananny ................ H04L 67/563 710/52 |
| 2014/0071886 | A1* | 3/2014 | Monte ................ H04B 7/18536 370/316 |
| 2017/0104733 | A1* | 4/2017 | Thanigasalam ....... H04W 12/02 |

(Continued)

Primary Examiner — Jungwon Chang
(74) Attorney, Agent, or Firm — Ference & Associates LLC

(57) ABSTRACT

An embodiment provides a method for transferring information utilizing a serial communication command structure over an unreliable or a non-continuous communication channel, including: establishing a serial command structure, wherein the establishing comprises defining a package structure having a predefined format, wherein the serial command structure comprises bounded data; and transmitting, over the unreliable or the non-continuous communication channel, data from a sending entity to a receiving entity utilizing the serial command structure and in the predefined format. Other aspects are described and claimed.

16 Claims, 2 Drawing Sheets

(56) References Cited

U.S. PATENT DOCUMENTS

| | | | |
|---|---|---|---|
| 2021/0006567 A1* | 1/2021 | Sella | H04W 12/108 |
| 2021/0184892 A1* | 6/2021 | Fujiwara | H04L 12/4604 |
| 2021/0240649 A1* | 8/2021 | Mooney | H04L 69/18 |

* cited by examiner

SERIAL COMMAND PROTOCOL ENCAPSULATING WIRE TRANSFER PROTOCOL

CROSS REFERENCE TO RELATED APPLICATION

This application claims priority to U.S. Provisional patent Application Ser. No. 62/968,610, filed on Jan. 31, 2020, and entitled "SERIAL COMMAND PROTOCOL ENCAPSULATING WIRE TRANSFER PROTOCOL," the contents of which are incorporated by reference herein.

FIELD

This application relates generally to obtaining information over a wireless connection, and, more particularly, to sending information between entities over an unreliable and/or non-continuous communication channel utilizing a serial communication command structure.

BACKGROUND

Transmitting information between entities is important. The ability to transmit the information utilizing a wireless connection allows for more flexibility regarding the entities that can communicate and the location of the entities with respect to each other. In other words, wireless transmissions allow for communication between entities that may not always communicate with each other or entities that need to communicate with multiple entities. For example, wireless transmissions allow for communication between an instrument and a mobile device, where the mobile device can communicate with many instruments. By utilizing wireless communication, the mobile device does not have to be physically wired into each instrument to receive information from the instrument. Different wireless communication techniques have different proximity requirements between the sending and receiving entities. For example, some wireless communication techniques may require entities to be in close proximity to each other, whereas other wireless communication techniques allow for a greater distance between the entities. Additionally, different wireless communication techniques have different reliability and security levels and also different power and processing requirements than other wireless communication techniques. Thus, the wireless communication technique that is chosen for a particular application is critical to ensuring the success of the transmission of information within the application.

BRIEF SUMMARY

In summary, one embodiment provides a method for transferring information utilizing a serial communication command structure over an unreliable and/or non-continuous communication channel, comprising: establishing a serial command structure, wherein the establishing comprises defining a package structure having a predefined format, wherein the serial command structure comprises bounded data, the packet size limiting an amount of data included in a transmission; and transmitting, over the unreliable or the non-continuous communication channel, data from a sending entity to a receiving entity utilizing the serial command structure and in the predefined format.

Another embodiment provides an information handling device for transferring information utilizing a serial communication command structure over an unreliable or a non-continuous communication channel, comprising: a processor; and a memory device that stores instructions executable by the processor to: establish a serial command structure, wherein the establishing comprises defining a package structure having a predefined format, wherein the serial command structure comprises bounded data; and transmit, over the unreliable or the non-continuous communication channel, data from a sending entity to a receiving entity utilizing the serial command structure and in the predefined format.

A further embodiment provides a product for transferring information utilizing a serial communication command structure over an unreliable or a non-continuous communication channel, comprising: a storage device that stores code, the code being executable by a processor and comprising: code that establishes a serial command structure, wherein the establishing comprises defining a package structure having a predefined format, wherein the serial command structure comprises bounded data; and code that transmits, over the unreliable or the non-continuous communication channel, data from a sending entity to a receiving entity utilizing the serial command structure and in the predefined format.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
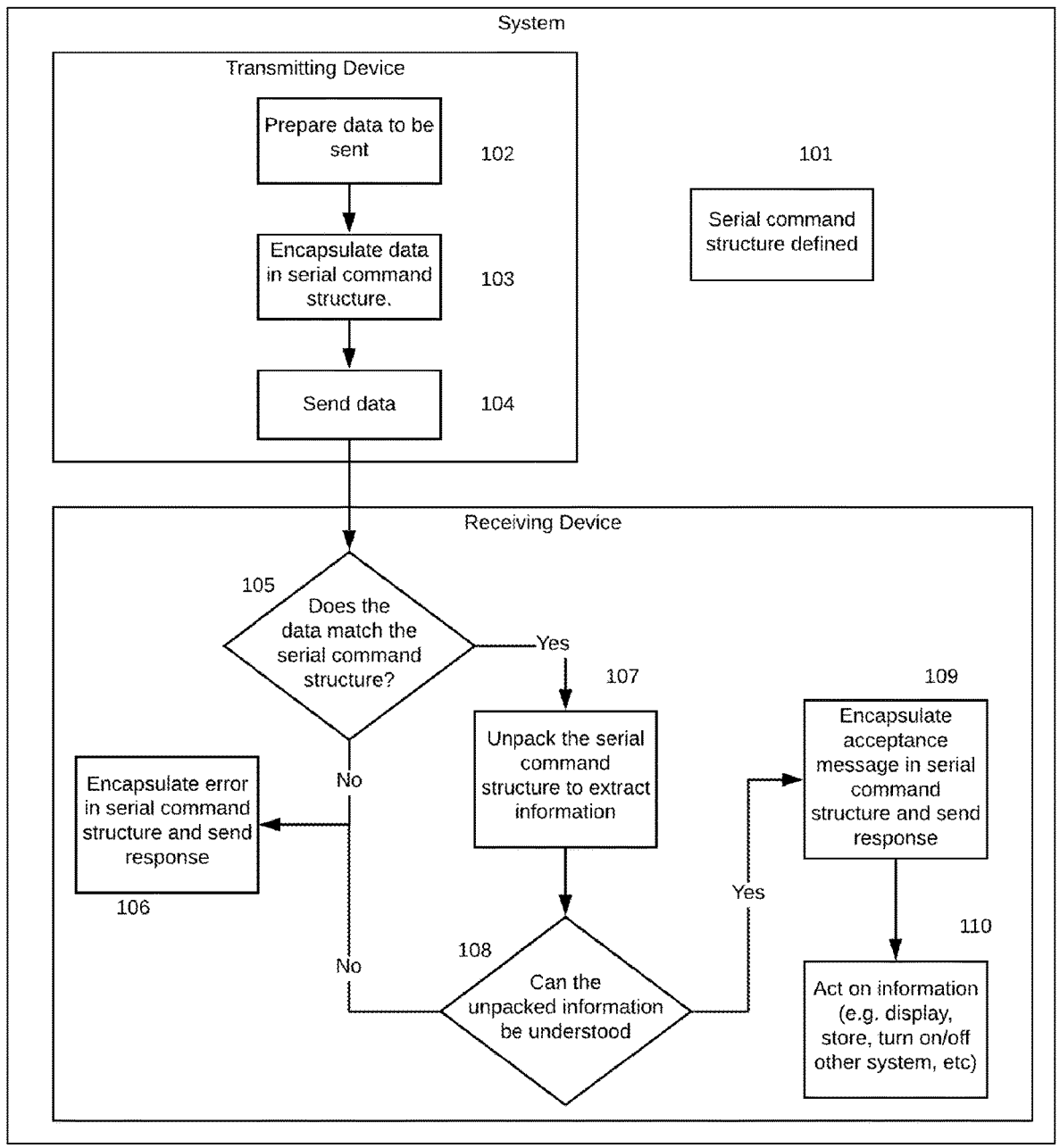
FIG. 1 illustrates an example flow diagram for transferring information utilizing a serial communication command structure over an unreliable and/or a non-continuous communication channel.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Communication of information between entities is useful for learning information from different entities. For example, a sending entity may be unable to process the information locally and, therefore, must send the information to a receiving entity for processing. As another example, a receiving entity may not have the capability to access a wide area network and may, therefore, require an intermediate device to receive needed data, for example, system updates, firmware updates, and the like. As another example, other entities may require information from a sending entity in order to analyze the information against information received from other sources or entities. Some entities may not be connected to a wide area network in order to ensure the security of the entity. However, these entities still need the ability to communicate and receive information. Thus, in order to allow transmission of information from or to the entity, the entity may be outfitted with the capability to communicate with other entities wirelessly. To ensure that these communications remain secure, the chosen wireless communication technique may only allow transmission of the information a short distance, for example, utilizing a near field communication technique, a short range communication technique, or the like.

Additionally, since the entity may be battery powered, the chosen wireless communication technique needs to require little power. Traditionally, these types of wireless communication techniques are non-continuous communication channels, meaning they do not continuously transmit information and, instead, only transmit information when there is information to be transmitted. By being non-continuous, these wireless communication techniques require substantially less power, thereby preserving battery power. One drawback to such communication techniques is that the amount of information that can be transmitted over the channel is usually very small with very small data packets. This is because the traditional way of utilizing these communication techniques is to transfer small packets of information. Thus, if a sending entity needs to transfer data that is larger than allowed by the communication technique, there is conventionally no mechanism or technique for doing so. Accordingly, more robust data transmission techniques must be utilized.

Accordingly, an embodiment provides a system and method for transferring information utilizing a serial communication command structure over an unreliable and/or a non-continuous communication channel. The system and method utilizes a serial communication command structure structure that defines a package structure. By defining a serial communication command structure structure, the system can emulate serial-type communication, or continuous stream communication, over an unreliable and/or a non-continuous communication channel. The package structure identifies a predefined format for data transmission within the serial communication process. Placing data to be transmitted in the predefined format of the serial command structure, the data can be transmitted over an unreliable and/or a non-continuous communication channel from a sending entity to a receiving entity. The receiving entity can then process and verify the data, and take any action with respect to the data as needed by the receiving entity.

The illustrated example embodiments will be best understood by reference to the figures. The following description is intended only by way of example, and simply illustrates certain example embodiments.

Referring to FIG. 1, an example system and method for transferring information utilizing a serial communication command structure over an unreliable and/or a non-continuous communication channel is illustrated. The non-continuous communication channel may be any connection that allows serial communication, for example, a short-range communication channel such as BLUETOOTH Low Energy (also called BLUETOOTH Smart), Wi-Fi, or the like. BLUETOOTH is a registered trademark of Bluetooth SIG, Inc., in the United States and other countries. The unreliable and/or non-continuous communication channel may be a communication channel that only transmits information when triggered, usually when there is information to be transmitted. Thus, an unreliable and/or a non-continuous communication channel is not continuously broadcasting information and only broadcasts information when the sending entity has information to broadcast. This type of communication channel requires less power as compared to continuous communication channels, thereby extending the battery life of the sending entity.

An example that will be used throughout this application, one of the sending or receiving entities is an instrument that takes measurement values, for example, water quality measurement values. The role of the instrument can change between the sending entity and the receiving entity depending on whether data is being transmitted to or from the instrument. For example, in the scenario that the instrument is transmitting measurement values, the instrument would be the sending entity. On the other hand, in the scenario that the instrument is receiving a firmware update, the instrument would be the receiving entity. The other entity may be a portable device, for example, a mobile phone, a tablet, a laptop, an instrument reader, or the like. The portable device may include an application that can both send data to one or more instruments and receive data from one or more instruments.

At 101, the system establishes a serial command structure. The serial command structure is a serial structure that can be utilized with serial-type communication channels, for example, those mentioned above. However, since the above mentioned communication channels are not designed for sustained data transfer and communication, the serial command structure is designed to allow for more data, meaning larger data packets, to be transmitted across the unreliable and/or non-continuous communication channel. In other words, a serial command structure is established that allows for a reliable data stream that allows for larger data packet transmissions than is conventionally allowed across the unreliable and/or non-continuous communication channel. For example, system updates can be transmitted from a portable device to an instrument. By establishing a serial command structure, the system can ensure that data can be sent over an unreliable and/or a non-continuous communication channel even if the protocol for sending the data is in a continuous stream. In other words, even if the data is sent in a continuous stream due to the format of the serial command structure, the unreliable and/or non-continuous communication channel can identify a start and an end to a data packet and ensure the entirety of the data packet is transmitted, thereby providing reliable data transmission.

The serial command structure defines a package structure having a predefined format. The predefined format may include a marker, command, or other identifier that identifies the start of a packet. The predefined format may also include a marker, command, or other identifier that identified the end of a packet. Knowing the start and end of the packet allows the receiving entity to be able to determine if the entire packet was received. Accordingly, the end command may be the output of an algorithm that validates all of the data was sent and that it was not changed during transmission. Also included in the predefined format may be the location of data within the packet. This data may correspond to the data that is being transmitted. Other information may be included within the data packet, for example, how much data is in the packet, a timestamp associated with transmission of the data, or the like. Accordingly, the predefined format may identify the location of this information within the data packet.

The serial command structure is established between all entities (e.g., receiving entities, sending entities, applications, systems, etc.) that may be using the command structure. In other words, the format defined by the serial command structure is known to any of the devices, systems, or applications that will be sending, receiving, or otherwise manipulating information that is formatted per the serial command structure. In order to maintain security of information transmitted utilizing the serial command structure, the serial command structure may include encryption. In this case, the serial command structure identifies how information will be encrypted so that it can be decrypted by a system, device, or application that is also utilizing the serial command structure, upon receipt of the information. Utilizing encryption may include just encrypting or obfuscating the data within the data packet or may include encrypting or obfuscating the entire data packet.

Additionally, the serial command structure defines a predetermined data packet size, which can be a default data packet size or a data packet size defined by a user, system, or application. The predetermined data packet size is also referred to as bounded data. The data packet size limits an amount of data that can be included in a transmission. The predetermined data packet size, although not specifically required, is generally larger than a data packet size that would be conventionally transmitted utilizing the selected communication channel. In the case that data to be transmitted is larger than the data packet size, the system may chunk the data into packet sizes that correspond to the data packet size. For example, if an instrument needs to receive a system update that is 3 kB, but the instrument can only receive 1 kB data transmissions, the system can chunk the data into three chunks of 1 kB. If, additionally, the communication channel only allows data transmissions of 256 B, the system chunks each of the 1 kB chunks into smaller chunks to fit within the communication channel size limits.

At 102, the system prepares to transmit the data. Any type of data can be prepared and placed within the data packet. Preparing the data within the data packet may include serializing the information into byte data, evaluating the size of the data, and using an algorithm to generate a value for future validation of the data. Preparation may also include identifying bytes that are reserved for the serial command structure definition and replacing those bytes with a marker and modified byte pair.

Per the example used here throughout, the information may include, but is not limited to, instrument identifiers or other identification information, measurement data obtained by the instrument, timestamp information which may identify when the data packet was created/transmitted or may identify when the measurement data was obtained, parameters of the instruments or devices of the instrument (e.g., probes, sensors, meters, lamps, etc.), a combination thereof, or the like. Measurement data may include any data that the instrument is designed to capture, for example, pH values of a water source, turbidity values of a fluid, lamp intensity output, specific indicator (e.g., chlorine, fluoride, iron, etc.) values, or any other measurement data. Parameters of the instruments may include information identifying what is being measured by the instrument, ranges or scales of the measurement data, measurement data unit information, information identifying what is being measured by each device of the instrument, and the like. The type of information that may be included in the data packet can be any type of information and may vary across different instruments, receiving entities, or sending entities.

At 103, the system encapsulates the data by assembling the serial command packet. This may include placing the data and metadata in a predetermined order. For instance, the packet may be predefined to have a command byte, followed by bytes representing the size of the data, followed by the data itself, and then finally including the validation value generated by an algorithm. The entire packet may then have start and stop bytes added to the beginning and end, respectively.

At 104, the system transmits or sends the data, over the unreliable and/or non-continuous communication channel, from the sending entity to the receiving entity. The transmission includes transmitting the data in the predefined format and utilizing the serial command structure. The data can be read by a receiving entity as long as the data conforms to the predefined format of the serial command structure.

Transmission of the data may be triggered via one of a plurality of mechanisms. One trigger may include the receiving entity requesting data from a sending entity. Another trigger may include the sending entity notifying the receiving entity that it has data to transmit and transmitting the data in response to receiving a response from the receiving entity. Another trigger may include the sending entity having information to transmit and simply broadcasting or publishing the information without determining whether a receiving entity is in proximity or will receive the information. In this scenario, a receiving entity may subscribe to the sending entity. Then, whenever the sending entity broadcasts or publishes information, the receiving entity simply receives the information without requiring additional steps.

Different triggers allow for different levels of interaction between the receiving and sending entities. Utilizing the trigger where the receiving entity requests information requires the entities to have a direct interaction and communicate with each other before the transmission of data. On the other hand, using the broadcasting trigger, the entities do not have to have a direct interaction or communicate with each other before receiving the information. Thus, the selected trigger may be based upon a level of interaction that a facility, system, or application wants to require between the two entities. Different interaction levels may result in different security levels. For example, if the receiving entity has to request the information, the receiving entity may have to provide some security token or identifier to the sending entity before the sending entity will make a connection and transmit information, thereby providing a more secure data transmission. On the other hand, even broadcast information can be secured through the use of data encryption as discussed above.

At 105, the data is received by the receiving entity, which may determine whether the data matches the serial command structure. If not, the receiving entity may use the same predetermined serial command structure to send an error message back to the original sending entity, as shown at 106. Upon receiving a packet that does conform to the predetermined serial command structure, the information will be unpacked and further evaluated for whether it can be understood, as indicated at 107 and 108. If it cannot be understood, the receiving entity may use the same predetermined serial command structure to send an error message back to the original sending entity, again as shown at 106.

At 109, upon receiving properly formatted data that can be understood, the receiving entity may provide a verification transmission back to the sending entity indicating that the data was received and could be read. In the example where the data was chunked into different chunks, after receiving the verification transmission from the receiving entity, the sending entity may send the next chunk of data. Thus, each of the data chunks may be transmitted separately, but the system can be assured that each data chunk was received and readable. This allows for large chunks of data to be sent while ensuring that the transmission is reliable. This is particularly useful when the data to be sent is something that could cause a change with the receiving entity, and, data received incorrectly, would result in malfunctions, for example, a system or firmware update, addition of an application, setting changes, or the like.

In the publish/subscribe example, determining if the data can be read by the receiving entity may simply be performed by the receiving entity. Unless the receiving entity is unable to read the information, the sending entity may continue to publish or broadcast information. In the event that it cannot be read, the receiving entity may notify the sending entity of the misread. The sending entity may then resend the data. Other methods for determining if the data can be read are contemplated and possible. For example, if the sending entity does not receive a verification transmission at all or within a predetermined timeframe after sending the data, the system may assume that the data was not readable or received by the receiving entity. As another example, if the receiving entity indicates that the data was damaged, the system may identify the data as unreadable. Other verification techniques are possible.

If the receiving entity has received data that can be understood, the system may take an action at 110. The action that is taken may be dependent on the receiving entity and the data that was transmitted. For example, if the transmitted data was a system update and was received by an instrument, the instrument may execute the system update. As another example, if the transmitted data was measurement data and was received by an application on a portable device, the application may display the measurement data, for example, in a graphical user interface within the application. Additionally, the application may analyze the measurement data and/or send the measurement data to a central server or central data storage location for processing, analysis, and/or storage.

It should also be noted that if the data was encrypted, the action may include decrypting the data in order to read the data. Additionally, reading the data includes reading the data packet in view of the serial command structure. In other words, the receiving entity is able to understand the data packet because the system can decipher the data packet, particularly the data packet format, based upon knowing the predefined format of the serial command structure.

The various embodiments described herein thus represent a technical improvement to conventional techniques for transmission of information utilizing an unreliable and/or a non-continuous communication channel. The described system and method allows for transmission of data that is larger than typically allowed within the communication channel. In other words, using the serial command structure allows for transmission of large amounts of data within data packets having a predefined format, thereby allowing for reliable communication of the data. Accordingly, the sending entities can conserve battery power using an unreliable and/or a non-continuous communication channel and still receive large amounts of data that would normally require different types of communication channels. Additionally, the serial command structure allows for encryption of the data, thereby providing a secure, reliable technique for transmitting data between sending and receiving entities.

Figure 2:
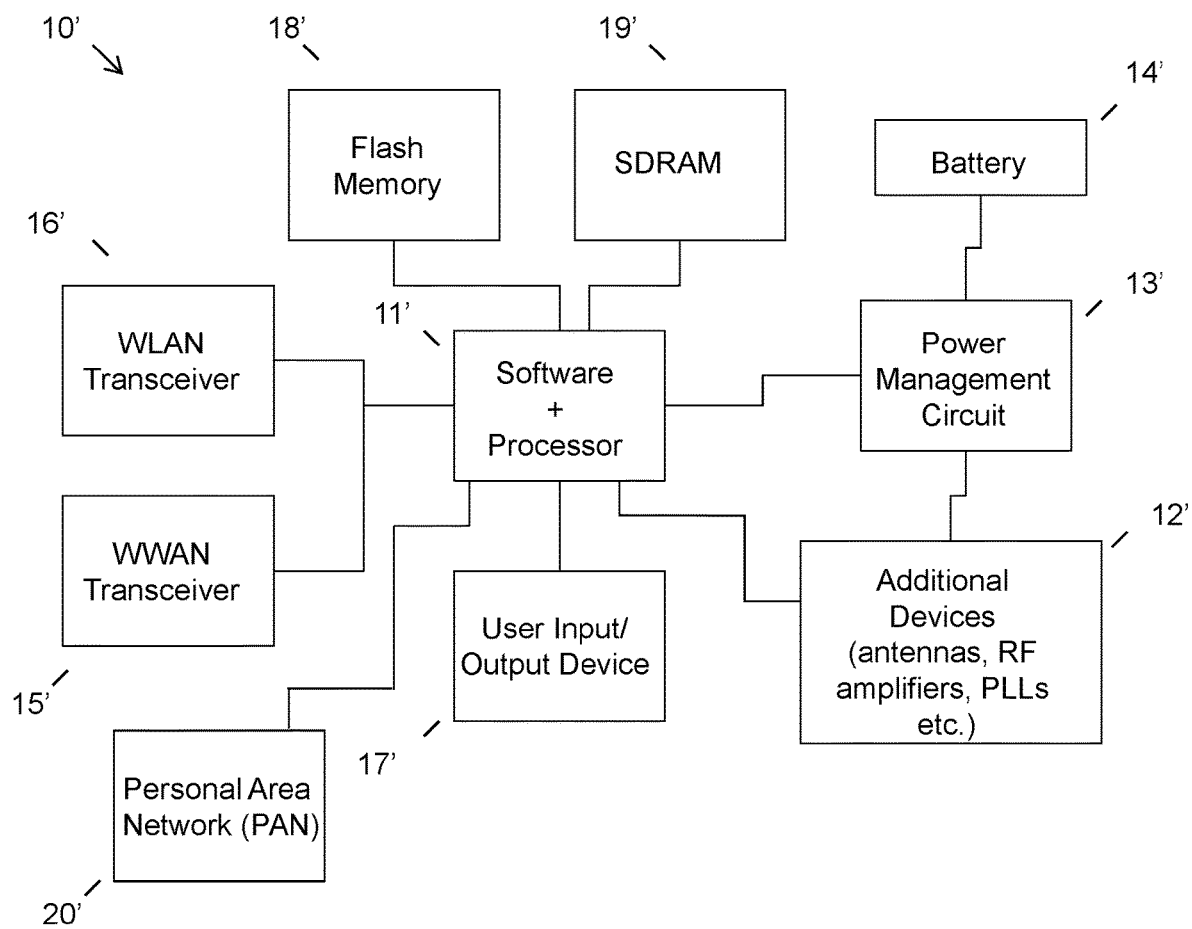
FIG. 2 illustrates an example of computer circuitry.

While various other circuits, circuitry or components may be utilized in information handling devices, with regard to an instrument for total chlorine measurement in seawater according to any one of the various embodiments described herein, an example is illustrated in FIG. 2. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform total chlorine measurement of a sample of seawater.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), personal area connection (PAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for transferring information utilizing a serial communication command structure over a wireless unreliable or a non-continuous communication channel, comprising:
    establishing a serial command structure to emulate serial-type communication over the wireless unreliable or the non-continuous communication channel, wherein the establishing comprises defining a package structure having a predefined format allowing for transmission of large data packet transmissions across the wireless unreliable or the non-continuous communication channel, wherein the predefined format comprises a start packet identifier and an end packet identifier and defines a location of data within a data packet formatted per the predefined format, wherein the serial command structure comprises bounded data having a predetermined packet size; and
    transmitting, over the wireless unreliable or the non-continuous communication channel and responsive to receiving a trigger to transmit data, the data from a sending entity to a receiving entity utilizing the serial command structure and in the predefined format, wherein the wireless unreliable or the non-continuous communication channel comprises a communication channel that is not continuously broadcasting information from the sending entity and that transmits serial communications, wherein the transmitting comprises chunking the data into a plurality of packets based upon the packet size, wherein each of the plurality of packets comprises a start packet identifier and an end packet identifier that are added to each of the plurality of packets after placing the data within the each of the plurality of packets.

2. The method of claim 1, wherein the chunking is responsive to identifying the data has a size greater than the packet size and wherein the chunking comprises chunking the data into data chunks having a size no larger than the packet size and wherein the transmitting comprises transmitting each of the data chunks separately.

3. The method of claim 1, wherein the package structure comprises an algorithm that validates the data was sent and that the data was not changed during the transmitting.

4. The method of claim 1, wherein the transmitting comprises publishing the data and wherein the receiving entity subscribes to the publishing to receive the data.

5. The method of claim 1, comprising verifying receipt of the data by the receiving entity via receipt of a response transmission from the receiving entity at the sending entity.

6. The method of claim 5, comprising retransmitting the data responsive to not receiving a verification of receipt of the data by the receiving entity.

7. The method of claim 1, wherein the data is encrypted within the serial command structure.

8. The method of claim 1, wherein the non-continuous communication channel comprises a short-range communication channel.

9. An information handling device for transferring information utilizing a serial communication command structure over a wireless unreliable or a non-continuous communication channel, comprising:
    a processor; and
    a memory device that stores instructions executable by the processor to:
    establish a serial command structure to emulate serial-type communication over the wireless unreliable or the non-continuous communication channel, wherein the establishing comprises defining a package structure having a predefined format allowing for transmission of large data packet transmissions across the wireless unreliable or the non-continuous communication channel, wherein the predefined format comprises a start packet identifier and an end packet identifier and defines a location of data within a data packet formatted per the predefined format, wherein the serial command structure comprises bounded data having a predetermined packet size; and transmit, over the wireless unreliable or the non-continuous communication channel and responsive to receiving a trigger to transmit data, the data from a sending entity to a receiving entity utilizing the serial command structure and in the predefined format, wherein the wireless unreliable or the non-continuous communication channel comprises a communication channel that is not continuously broadcasting information from the sending entity and that transmits serial communications, wherein the transmitting comprises chunking the data into a plurality of packets based upon the packet size, wherein each of the plurality of packets comprises a start packet identifier and an end packet identifier that are added to each of the plurality of packets after placing the data within the each of the plurality of packets.

10. The information handling device of claim 9, wherein the chunking is responsive to identifying the data has a size greater than the packet size and wherein the chunking comprises chunking the data into data chunks having a size no larger than the packet size and wherein the transmitting comprises transmitting each of the data chunks separately.

11. The information handling device of claim 9, wherein the package structure comprises an algorithm that validates the data was sent and that the data was not changed during the transmitting.

12. The information handling device of claim 9, wherein the transmitting comprises publishing the data and wherein the receiving entity subscribes to the publishing to receive the data.

13. The information handling device of claim 9, comprising verifying receipt of the data by the receiving entity via receipt of a response transmission from the receiving entity at the sending entity.

14. The information handling device of claim 13, comprising retransmitting the data responsive to not receiving a verification of receipt of the data by the receiving entity.

15. The information handling device of claim 9, wherein the data is encrypted within the serial command structure.

16. A product for transferring information utilizing a serial communication command structure over a wireless unreliable or a non-continuous communication channel, comprising:
  a storage device that stores code, the code being executable by a processor and comprising:
  code that establishes a serial command structure to emulate serial-type communication over the wireless unreliable or the non-continuous communication channel, wherein the establishing comprises defining a package structure having a predefined format allowing for transmission of large data packet transmissions across the wireless unreliable or the non-continuous communication channel, wherein the predefined format comprises a start packet identifier and an end packet identifier and defines a location of data within a data packet formatted per the predefined format, wherein the serial command structure comprises bounded data having a predetermined packet size; and
  code that transmits, over the wireless unreliable or the non-continuous communication channel and responsive to receiving a trigger to transmit data, the data from a sending entity to a receiving entity utilizing the serial command structure and in the predefined format, wherein the wireless unreliable or the non-continuous communication channel comprises a communication channel that is not continuously broadcasting information from the sending entity and that transmits serial communications, wherein the transmitting comprises chunking the data into a plurality of packets based upon the packet size, wherein each of the plurality of packets comprises a start packet identifier and an end packet identifier that are added to each of the plurality of packets after placing the data within the each of the plurality of packets.

* * * * *